United States Patent
Wang et al.

(10) Patent No.: US 12,457,494 B2
(45) Date of Patent: Oct. 28, 2025

(54) INFORMATION PROCESSING METHOD AND RELATED NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Ke Wang, Beijing (CN); Fuwen Liu, Beijing (CN); Xiaoting Huang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 576 days.

(21) Appl. No.: 17/795,245

(22) PCT Filed: Jan. 11, 2021

(86) PCT No.: PCT/CN2021/071125
§ 371 (c)(1),
(2) Date: Sep. 26, 2022

(87) PCT Pub. No.: WO2021/151365
PCT Pub. Date: Aug. 5, 2021

(65) Prior Publication Data
US 2023/0096392 A1    Mar. 30, 2023

(30) Foreign Application Priority Data
Jan. 30, 2020  (CN) .................. 202010077513.8

(51) Int. Cl.
*H04W 12/06* (2021.01)
*H04W 12/69* (2021.01)

(52) U.S. Cl.
CPC ............ *H04W 12/06* (2013.01); *H04W 12/69* (2021.01)

(58) Field of Classification Search
CPC ...... H04W 12/69; H04W 12/06; H04W 12/02
See application file for complete search history.

(56) References Cited

U.S. PATENT DOCUMENTS

| 2021/0014781 A1 | 1/2021 | Ianev et al. |
| 2021/0243600 A1 | 8/2021 | Yu |

(Continued)

FOREIGN PATENT DOCUMENTS

| CN | 106713406 A | 5/2017 |
| CN | 110351721 A | 10/2019 |

(Continued)

OTHER PUBLICATIONS

"Technical Specification Group Core Network and Terminals", 3GPP TS 24.501, WG1, No. V16.3.0, Dec. 2019, 3rd Generation Partnership Project; Non-Access-Stratum (NAS) protocol for 5G System (5GS); Stage 3 (Release 16), pp. 1-645.

(Continued)

*Primary Examiner* — Huy D Vu
*Assistant Examiner* — Bao G Nguyen
(74) *Attorney, Agent, or Firm* — Cooper Legal Group, LLC (57) ABSTRACT

Disclosed in the embodiments of the present disclosure are an information processing method and a related network device. The method comprises: the network device receiving a first message which is sent by an access and mobility management function (AMF) and is used for slice authentication, the first message comprising a first slice identifi- (Continued)

---

101 — A network device receives a first message for slice authentication sent by an AMF, the first message includes a first slice identifier, a first slice user identifier and a first card user identifier 102 — Determine a first pseudo code and a first address of an authentication server corresponding to the first slice identifier, and generate a second message including the first pseudo code, the first slice user identifier and the first card user identifier 103 — Send the second message to the authentication server based on the first address cation, a first slice user identification and a first card user identification; determining a first pseudo code corresponding to the first slice identification and a first address of an authentication server, and generating a second message comprising the first pseudo code, the first slice user identification and the first card user identification; and sending the second message to the authentication server on the basis of the first address.

20 Claims, 4 Drawing Sheets

(56) References Cited

U.S. PATENT DOCUMENTS

| | | | |
|---|---|---|---|
| 2022/0046532 A1* | 2/2022 | Hu | H04W 48/18 |
| 2022/0116816 A1* | 4/2022 | Liang | H04W 48/04 |

FOREIGN PATENT DOCUMENTS

| | | |
|---|---|---|
| CN | 110417563 A | 11/2019 |
| CN | 110431820 A | 11/2019 |
| JP | 2019097140 A | 6/2019 |
| WO | 2019185758 A1 | 10/2019 |
| WO | 2019206286 A1 | 10/2019 |

OTHER PUBLICATIONS

Supplementary European Search Report in the European application No. 21748458.3, mailed on Jun. 16, 2023, 11 pages.
Notice of Allowance of the Japanese application No. 2022-546541, issued on Aug. 16, 2023, 5 pages with English translation.
"Draft for Network Slice Specific Authentication Procedures", Oct. 2019, 3GPP TSG-SA3, Meeting #97, S3-194541, Reno, US, Source to WG: Nokia, Nokia Shanghai Bell, Ericsson, Huawei, HiSilicon, InterDigital, 9 pgs.
"DraftCR—Proposed Call Flow for Network Slice Specific Authentication and Authorization", Nov. 2019, 3GPP TSG-SA WG3, Meeting #97, S3-194212, Reno (US), Source to WG: Ericsson, 4 pgs.
"DraftCR—Proposed Call Flow for Network Slice Specific Authentication and Authorization", Nov. 2019, 3GPP TSG-SA WG3, Meeting #97, S3-194537, Reno (US), Source to WG: Ericsson, Huawei, HiSilicon, 4 pgs.
"Clarifications to Solution #10 on Protecting S-NSSAIs", Nov. 2019, 3GPP Tsg Sa WG3 (Security), Meeting #97, S3-194544, Reno (US), Source Qualcomm Incorporated, 3 pgs.
International Search Report in the international application No. PCT/CN2021/071125, mailed on Apr. 9, 2021, 3 pgs.
English translation of the Written Opinion of the International Search Authority in the international application No. PCT/CN2021/071125, mailed on Apr. 9, 2021, 4 pgs.
"Procedures for the 5G System (5GS)", Sep. 2022, 3GPP TS 23.502, V17.6.0, 3rd Generation Partnership Project; Technical Specification Group Services and System Aspects; Stage 2 (Release 17), 741 pgs.

* cited by examiner

INFORMATION PROCESSING METHOD AND RELATED NETWORK DEVICE

CROSS-REFERENCE TO RELATED APPLICATION

The present disclosure is based on and claims priority to Chinese patent application No. 202010077513.8, filed on Jan. 30, 2020, the disclosure of which is hereby incorporated by reference in its entirety.

TECHNICAL FIELD

The disclosure relates to the technical field of network slice, in particular to an information processing method and a related network device.

BACKGROUND

Network slice is one of the important characteristics of a 5G network. Network slice is a general name of solutions provided aiming at service differentiation and multi-tenant requirements, which aims to enable an operator to create a customized special network based on the requirements of vertical industries through flexible design in multiple aspects such as function, performance, isolation, operation and maintenance and the like.

Slice authentication is authentication performed after first authentication for access to the 5G network, which mainly provides a network access authentication function between a user equipment (UE) and a slice network (for example, a slice renter). When an authentication server is provided and operated by the slicing renter, during the process of slice authentication, Single-Network Slice Selection Assistance Information (S-NSSAI) needs to be sent to the authentication server by an Access and Mobility Management Function (AMF). In the process of slice re-authentication or slice authentication revocation, a network side needs to send the S-NSSAI to the AMF, so as to inform a slice which needs to be operated.

Since the S-NSSAI belongs to an operator, and contains privacy information, the above mode may expose privacy information of the operator.

SUMMARY

Embodiments of the disclosure are expected to provide an information processing method and a related network device.

In order to achieve the purpose, the technical solutions in the embodiments of the disclosure are implemented as follows.

In a first aspect, the embodiments of the disclosure provide an information processing method, which includes the following operations.

A network device receives a first message for slice authentication sent by an AMF; and the first message includes a first slice identifier, a first slice user identifier and a first card user identifier.

A first pseudo code and a first address of an authentication server corresponding to the first slice identifier are determined, and a second message including the first pseudo code, the first slice user identifier and the first card user identifier is generated.

The second message is sent to the authentication server based on the first address.

In some optional embodiments of the disclosure, the operation that the first pseudo code and the first address of the authentication server corresponding to the first slice identifier are determined includes the following operations.

The first pseudo code and the first address of the authentication server corresponding to the first slice identifier are determined based on a pre-stored first mapping set, and the first mapping set includes a plurality of mappings among slice identifiers, one or more addresses of one or more authentication servers and pseudo codes.

Or, the first slice identifier is sent to a Unified Data Manager (UDM), the UDM storing the first mapping set.

The first pseudo code and the first address of the authentication server, which are sent by the UDM and corresponding to the first slice identifier, are acquired.

In some optional embodiments of the disclosure, the method further includes: the network device stores a second mapping among an identifier of the second message, the first card user identifier and the first slice identifier.

The network device receives a third message sent by the authentication server, the third message is a message corresponding to the second message and containing a slice authentication result, and the third message includes the identifier of the second message.

The first card user identifier and the first slice identifier corresponding to the identifier of the second message are determined based on the second mapping.

In some optional embodiments of the disclosure, the method further includes: the network device receives a third message sent by the authentication server, the third message is a message corresponding to the second message and containing a slice authentication result, and the third message includes the first pseudo code, the first card user identifier and an identifier of the second message.

The first slice identifier corresponding to the first pseudo code is determined according to the first mapping set.

In some optional embodiments of the disclosure, the method further includes: the network device receives a request for slice re-authentication or slice revocation sent by the authentication server, and the request includes: a second pseudo code and a second card user identifier.

A second slice identifier corresponding to the second pseudo code is determined.

In some optional embodiments of the disclosure, the operation that the second slice identifier corresponding to the second pseudo code is determined includes the following operations.

The second slice identifier corresponding to the second pseudo code is determined based on a pre-stored first mapping set, the first mapping set includes a plurality of mappings among slice identifiers, one or more addresses of the authentication servers and pseudo codes.

Or, the second slice identifier is sent to a UDM, the UDM storing the first mapping set.

The second slice identifier sent by the UDM and corresponding to the second pseudo code is acquired.

In a second aspect, the embodiments of the disclosure further provide an information processing method, which includes the following operations.

An authentication server receives a second message from a network device; the second message includes: a first slice user identifier, a first card user identifier and a first pseudo code; and the first pseudo code corresponds to a first slice identifier for slice authentication.

Authentication authorization information is determined based on the first slice user identifier and the first pseudo code.

In some optional embodiments of the disclosure, the method further includes: the authentication server performs authentication based on the authentication authorization information to obtain a slice authentication result.

A third message is sent to the network device, the third message is a message corresponding to the second message and containing a slice authentication result, the third message includes an identifier of the second message, or the third message includes the first pseudo code, the first card user identifier and an identifier of the second message.

In some optional embodiments of the disclosure, the method further includes: the authentication server sends a request for slice re-authentication or slice revocation sent to the network device, and the request includes: a second pseudo code and a second card user identifier.

In a third aspect, the embodiments of the disclosure further provide a network device, which includes a first communication unit and a first processing unit.

The first communication unit is configured to receive a first message for slice authentication sent by an AMF; and the first message includes a first slice identifier, a first slice user identifier and a first card user identifier.

The first processing unit is configured to determine a first pseudo code and a first address of an authentication server corresponding to the first slice identifier, and generate a second message including the first pseudo code, the first slice user identifier and the first card user identifier.

The first communication unit is further configured to send the second message to the authentication server based on the first address.

In some optional embodiments of the disclosure, the first processing unit is configured to: determine a first pseudo code and a first address of the authentication server corresponding to the first slice identifier based on a pre-stored first mapping set; the first mapping set includes a plurality of mappings among slice identifiers, one or more addresses of one or more authentication servers and pseudo codes; or, send, by means of the first communication unit, the first slice identifier to a UDM storing the first mapping set, and acquire the first pseudo code and the first address of the authentication server which is sent by the UDM and corresponds to the first slice identifier.

In some optional embodiments of the disclosure, the network device further includes a storage unit, which is configured to store a second mapping among an identifier of the second message, the first card user identifier and the first slice identifier.

The first communication unit is further configured to receive a third message sent by the authentication server; the third message is a message corresponding to the second message and containing a slice authentication result; and the third message includes an identifier of the second message.

The first processing unit is further configured to determine the first card user identifier and the first slice identifier corresponding to the identifier of the second message based on the second mapping.

In some optional embodiments of the disclosure, the first communication unit is further configured to receive a third message sent by the authentication server, the third message is a message corresponding to the second message and containing a slice authentication result; and the third message includes the first pseudo code, the first card user identifier and an identifier of the second message.

The first processing unit is further configured to determine the first slice identifier corresponding to the first pseudo code according to the first mapping set.

In some optional embodiments of the disclosure, the first communication unit is further configured to receive a request for slice re-authentication or slice revocation sent by the authentication server; and the request includes: a second pseudo code and a second card user identifier.

The first processing unit is further configured to determine a second slice identifier corresponding to the second pseudo code.

In some optional embodiments of the disclosure, the first processing unit is configured to determine a second slice identifier corresponding to the second pseudo code based on a pre-stored first mapping set; the first mapping set includes a plurality of mappings among slice identifiers, one or more addresses of one or more authentication servers and pseudo codes; or, send, by means of the first communication unit, the second slice identifier to a UDM, the UDM storing the first mapping set; and acquire a second slice identifier which is sent by the UDM and corresponds to the second pseudo code.

In a fourth aspect, the embodiments of the disclosure further provide an authentication server, which includes a second communication unit and a second processing unit.

The second communication unit is configured to receive a second message from a network device; the second message includes: a first slice user identifier, a first card user identifier and a first pseudo code; and the first pseudo code corresponds to a first slice identifier for slice authentication.

The second processing unit is configured to determine authentication authorization information based on the first slice user identifier and the first pseudo code.

In some optional embodiments of the disclosure, the second processing unit is further configured to perform authentication based on the authentication authorization information to obtain a slice authentication result.

The second communication unit is further configured to send a third message to the network device; the third message is a message corresponding to the second message and containing a slice authentication result; the third message includes an identifier of the second message; or the third message includes the first pseudo code, the first card user identifier and an identifier of the second message.

In some optional embodiments of the disclosure, the second communication unit is further configured to send a request for slice re-authentication or slice revocation to the network device; and the request includes: a second pseudo code and a second card user identifier.

In a fifth aspect, the embodiments of the disclosure further provide a computer readable storage medium, on which a computer program is stored. When executed by a processor, the program implements the steps of the method according to first aspect or the second aspect of the embodiments of the disclosure.

In a sixth aspect, the embodiments of the disclosure provide a network device, including a memory, a processor and a computer program which is stored on the memory and may run on the processor. When executing the program, the processor implements the steps of the method according to the first aspect or the second aspect of the embodiments of the disclosure.

According to the information processing method and the related network device provided by the embodiments of the disclosure, the method includes: the network device receives the first message for slice authentication sent by an AMF; the first message includes the first slice identifier, the first slice user identifier and the first card user identifier; the first pseudo code and the first address of the authentication server corresponding to the first slice identifier are determined, and the second message including the first pseudo code, the first slice user identifier and the first card user identifier is generated; and the second message is sent to the authentication server based on the first address. By adopting the technical solutions of the embodiments of the disclosure, the first slice identifier is mapped into the first pseudo code through the network device, and the second message containing the first pseudo code is sent, so that the first pseudo code does not carry privacy information any more, and reveal of the privacy information is avoided.

DETAILED DESCRIPTION

The disclosure is elaborated in detail below with reference to the drawings and specific embodiments.

Figure 1:
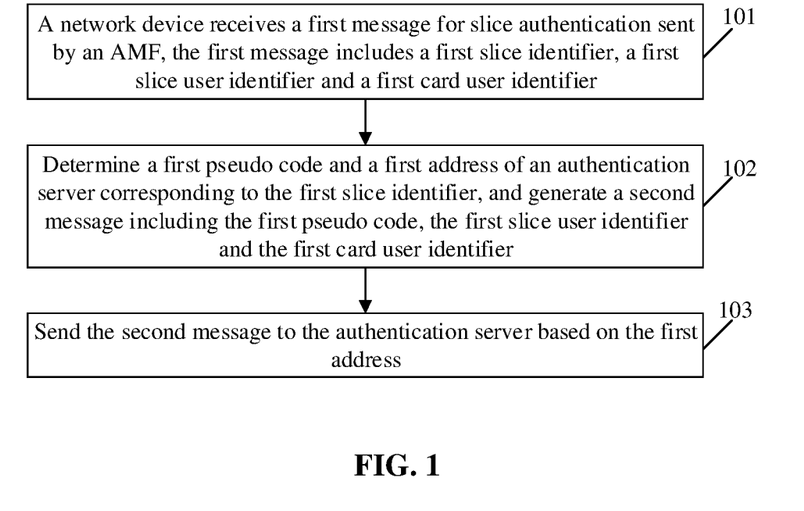
FIG. 1 is a flowchart I of an information processing method according to an embodiment of the disclosure.

The embodiments of the disclosure provide an information processing method. FIG. 1 is a flowchart I of an information processing method according to an embodiment of the disclosure. As shown in FIG. 1, the method includes the following operations.

At S101, a network device receives a first message for slice authentication sent by an AMF. The first message includes a first slice identifier, a first slice user identifier and a first card user identifier.

At S102, a first pseudo code and a first address of an authentication server corresponding to the first slice identifier are determined, and a second message including the first pseudo code, the first slice user identifier and the first card user identifier is generated.

At S103, the second message is sent to the authentication server based on the first address.

In the embodiment, the network device may be operated by an operator, and is configured to forward messages between the AMF and the authentication server (for example, responsible for addressing the authentication server outside a unified interface) and perform conversion between the slice identifier and pseudo code in the embodiment of the disclosure. In an implementation mode, the network device can be implemented by an authentication proxy server, which may be, for example, an Authentication Authorization Accounting-Proxy (AAA-P) server; and in another implementation mode, the network device may also be a network device newly added in a communication system.

In the embodiment, slice authentication can be carried out by adopting an Extensible Authentication Protocol (EAP). The AMF acts as an authenticator in EAP authentication, triggers a slice-specific authentication procedure, and exchanges authentication messages between a user equipment (UE) and an authentication server; and the AMF determines the slice networks to which the UE registers according to the authentication result and issues the slice identifier allowed to be accessed to the UE.

In the embodiment, the authentication server is operated by a third party, or in other words, the authentication server is operated by a slice renter. The authentication server is configured to perform authentication, authorization and accounting for the access to one or several specified slices. It is to be understood that if the slice renter subscribes to one or a plurality of network slices, authentication, authorization and accounting for slice access to the subscribed network slices can be performed through one authentication server or a plurality of authentication servers, and each authentication server in the plurality of authentication servers can perform authentication, authorization and accounting for slice access to each of the subscribed network slices. Exemplarily, the authentication server, for example, may be an AAA Server (AAA-S).

In the embodiment, the slice identifier (for example, the first slice identifier) is an identifier that uniquely identifies a slice network, and correspondingly, the first slice identifier is an identifier that uniquely identifies a certain slice network. Exemplarily, the slice identifier may specifically be Single Network Slice Selection Assistance Information (S-NSSAI). The slice user identifier is a subscription identifier of a terminal user in a slice network, and correspondingly, the first slice user identifier is a slice identifier of the terminal user in a certain slice network. It is to be understood that if a user uses a certain network slice service, user registration needs to be carried out first, and the registered user name can be used as a slice user identifier. Exemplarily, when the slice processing procedure (for example, slice authentication procedure, and subsequent slice revocation procedure, slice re-authentication procedure) adopts an EAP protocol, the slice user identifier may be an EAP ID. The card user identifier is a subscription identifier of a UE in the operator network, and as a visiting user of the operator network, it is bound with a Subscriber Identification Module (SIM)) card to be used as an identity identification for accessing the network. Correspondingly, the first card user identifier may be a subscription identifier of a certain UE in the operator network. Optionally, the card user identifier may be a subscription identifier that is publicly available in the subscription identifiers of a UE in the operator network. It is to be understood that the subscription identity of the UE in the operator network may be of various types, and may include, for example: a SUbscription Permanent Identifier (SUPI), a SUbscription Concealed Identifier (SUCI), a 5G Globally Unique Temporary UE Identity (5G-GUTI), a Generic Public Subscription Identifier (GPSI) and the like, and the card user identifier described in the embodiment can be an identifier that is publicly available, that is, an identifier that can be known by a third party. Exemplarily, the card user identifier can be represented by a Generic Public Subscription Identifier (GPSI).

It is to be understood that one UE can subscribe to one or more network slices; and a user corresponding to one UE can subscribe to different slice networks through the same or different slice user identifiers, for example, the user can register two different network slice services with the same user name. It is to be understood that one card user identifier can correspond to at least one slice user identifier, while each slice user identifier can correspond to at least one slice identifier.

In some optional embodiments of the disclosure, the operation that the first pseudo code and the first address of the authentication server corresponding to the first slice identifier are determined includes: the first pseudo code and the first address of the authentication server corresponding to the first slice identifier are determined based on a pre-stored first mapping set, the first mapping set includes a plurality of mappings among slice identifiers, the address(es) of the authentication server(s) and pseudo codes; or, the first slice identifier is sent to a UDM storing the first mapping set therein; and the first pseudo code and the first address of the authentication server which are sent by the UDM and correspond to the first slice identifier are acquired.

In the embodiment, since the slice identifier includes privacy information, by taking the slice identifier being an S-NSSAI as an example, the S-NSSAI includes a Slice/Service Type (SST) and a Slice Differentiator (SD), the SST represents the expected network slice behavior in terms of characteristics and services, and has a length of 8 bits; and the SD is a supplement to ST, which is configured to further distinguish multiple network slices of the same SST, and has a length of 24 bits. The S-NSSAI belongs to internal assets of an operator, and definition and distribution of the S-NSSAI by the operator may expose the information of the operator or a partner. Exemplarily, the S-NSSAI may carry the regional information of network planning and implementation of the operator, the company and industry information of private network customers, and the like. However, the authentication server of the embodiment of the disclosure is the server device of the renter of the slice network, and if the S-NSSAI of the operator is collected by an external party, the related privacy information of the operator may be revealed.

Based thereon, in the embodiment, a first pseudo code and a first address of an authentication server corresponding to the first slice identifier are determined based on a first mapping set, a second message including the first pseudo code, the first slice user identifier and the first card user identifier is generated, and the second message is sent to the authentication server, so that reveal of the privacy information can be avoided.

In the embodiment, when a third party signs a contract with an operator to subscribe to a slice network, the operator generates a slice(s) and corresponding slice identifier(s) (for example, S-NSSAI(s)) that meet the requirements, the two parties negotiate the slices for which third party is needed to perform slice authentication, and the third party provides the address(es) of the authentication server(s) that perform(s) slice authentication. Meanwhile, the operator generates the corresponding pseudo code(s) for the slice identifier(s). In an implementation mode, a first mapping set containing a plurality of mappings among slice identifiers, address(es) of the authentication server(s) and pseudo codes is stored in the network device in advance, and then the network device can determine the first pseudo code and the first address of the authentication server corresponding to the first slice identifier by querying the first mapping. In another implementation mode, a first mapping set containing a plurality of mappings among slice identifiers, address(es) of the authentication server(s) and pseudo codes is stored in a UDM in advance, the network device can send the first slice identifier to UDM, and UDM queries the stored first mapping set based on the first slice identifier to obtain the first pseudo code and the first address of authentication server corresponding to the first slice identifier, and then sends the first pseudo code and the first address of the authentication server corresponding to the first slice identifier to the network device.

Exemplarily, by taking the slice identifier being S-NSSAI, the address of the authentication server being AAA-S address, and the pseudo code being S-NSSAI' as an example, the first mapping set may be shown in Table 1 below.

TABLE 1

| S-NSSAI | AAA-S address | S-NSSAI' |
|---|---|---|
| S-NSSAI 1 | IP 1 | a |
| S-NSSAI 2 | IP 1 | b |
| S-NSSAI 3 | IP 2 | c |
| S-NSSAI 4 | IP 2 | a |

In the embodiment, any mapping in the first mapping set is generated and stored in the first mapping set when the corresponding network slice in the mapping is subscribed.

In some optional embodiments of the disclosure, the method further includes: the network device stores a second mapping among the identifier of the second message, the first card user identifier and the first slice identifier; the network device receives a third message sent by the authentication server, the third message is a message corresponding to the second message and containing a slice authentication result, and the third message includes an identifier of the second message; and the first card user identifier and the first slice identifier corresponding to the identifier of the second message are determined based on the second mapping.

In the embodiment, the network device stores the second mapping among the identifier of the second message, the first card user identifier and the first slice identifier before sending the second message. The identifier of the second message may be a serial number of the message; it is to be understood that each message is assigned a corresponding serial number, indicating which message it is, and the identifier of the message is forwarded with the message. In the embodiment, the second mapping among the identifier of the second message, the first card user identifier and the first slice identifier may be stored before the second message is sent, when the second message is sent, or after the second message is sent, so that the corresponding slice identifier can be found subsequently based on the identifier of the message.

After the second message is sent to the authentication server, the authentication server determines authentication authorization information based on the first pseudo code and the first slice user identifier, performs authentication to obtain a slice authentication result, and sends a third message containing the slice authentication result to the network device. The third message includes an identifier of the second message. The network device may obtain the first card user identifier and the first slice identifier corresponding to the identifier of the second message based on the stored second mapping.

In some optional embodiments of the disclosure, the method further includes that, the network device receives a third message sent by the authentication server. The third message is a message corresponding to the second message and containing a slice authentication result. The third message includes the first pseudo code, the first card user identifier and the identifier of the second message. The method further includes that, the first slice identifier corresponding to the first pseudo code is determined according to the first mapping set.

In the embodiment, after the second message is sent to the authentication server, the authentication server determines authentication authorization information based on the first pseudo code and the first slice user identifier, performs authentication to obtain a slice authentication result, and sends a third message containing the slice authentication result to the network device. The third message includes the first pseudo code, the first card user identifier and the identifier of the second message, and the network device may determine the first slice identifier corresponding to the first pseudo code based on the first mapping.

Furthermore, the method may further include that, the network device generates a fourth message including the slice authentication result, the first slice identifier and the first card user identifier, and sends the fourth message to the AMF.

In some optional embodiments of the disclosure, the method further includes that, the network device receives a request for slice re-authentication or slice revocation sent by the authentication server. The request includes: a second pseudo code and a second card user identifier. The method further includes that, a second slice identifier corresponding to the second pseudo code is determined.

In the embodiment, when a third party signs a contract with an operator to subscribe to a slice network, on one hand, the operator generates a slice(s) and a corresponding slice identifier(s) that meet the requirements, and generate corresponding pseudo code(s) for the slice identifier(s), the two parties negotiate the slice(s) for which a third party is needed to perform slice authentication, and the third party provides the address(es) of the authentication server(s) that perform(s) slice authentication, namely, generates the above-mentioned first mapping set. On the other hand, the operator delivers the pseudo code(s) to the third party, for example, the renter of the network slice(s), and the authentication server of the third party completes determination of the corresponding authentication authorization information.

Based thereon, when the slice needs re-authentication or slice revocation, the authentication server sends a request for slice re-authentication or slice revocation to the network device. The request includes a second pseudo code and a second card user identifier. The method further includes that, the network device may determine a corresponding second slice identifier based on the second pseudo code in the request. Specifically, the network device can determine the second slice identifier corresponding to the second pseudo code based on the above-mentioned first mapping set.

In some optional embodiments of the disclosure, the operation that the second slice identifier corresponding to the second pseudo code is determined includes: the second slice identifier corresponding to the second pseudo code is determined based on a pre-stored first mapping set, the first mapping set including a plurality of mappings among slice identifiers, the address(es) of the authentication server(s) and pseudo codes; or, the second slice identifier is sent to a UDM storing the first mapping set therein, and the second slice identifier which is sent by the UDM and corresponds to the second pseudo code is acquired.

Figure 2:
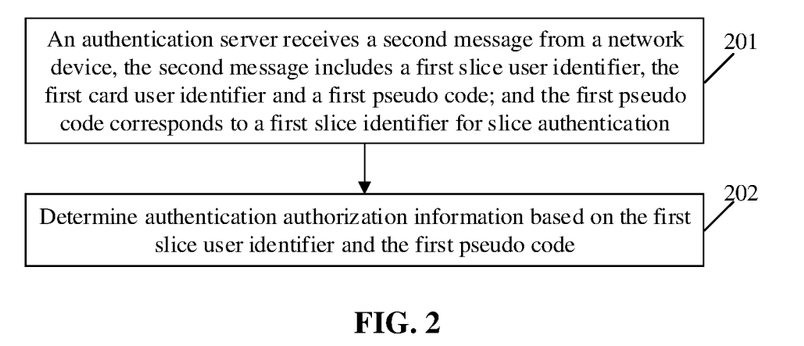
FIG. 2 is a flowchart II of an information processing method according to an embodiment of the disclosure.

Based on the above-mentioned embodiment, the embodiments of the disclosure further provide an information processing method. FIG. 2 is a flowchart I of an image processing method according to an embodiment of the disclosure. As shown in FIG. 2, the method includes the following operations.

At S201, an authentication server receives a second message from a network device. The second message includes a first slice user identifier, a first card user identifier and a first pseudo code. The first pseudo code corresponds to a first slice identifier for slice authentication.

At S202, authentication authorization information is determined based on the first slice user identifier and the first pseudo code.

In the embodiment, the authentication server is operated by a third party, or in other words, the authentication server is operated by a slice renter. The authentication server is configured to perform authentication, authorization and accounting for access to one or several specified slices. It is to be understood that if the slice renter subscribes to one or more certain network slices, authentication, authorization and accounting for slice access to the subscribed network slices can be performed through one authentication server or a plurality of authentication servers, and each authentication server in the plurality of authentication servers can perform authentication, authorization and accounting for slice access of each of the subscribed network slices. Exemplarily, the authentication server, for example, may be an (AAA-S).

A third-party vertical industry may adopt one authentication server to handle authentication, authorization and accounting of a plurality of services, or may adopt a plurality of authentication servers, each handling authentication, authorization and accounting of a different service. Generally, one authentication server is used to handle a plurality of Service-Level Agreement (SLA) levels of one service, and one SLA of one service corresponds to one slice. Therefore, there may be a one-to-many correspondence between the authentication server and the slice identifiers, that is, one authentication server manages the authentication, authorization and accounting of a plurality of slices, for example, one authentication server manages a plurality of service slices or a plurality of SLA slices of one service.

In the embodiment, when a third party signs a contract with an operator to subscribe to a slice network, on one hand, the operator generates a slice(s) t and a corresponding slice identifier(s) (for example, S-NSSAI(s)) hat meet the requirements, the two parties negotiate the slice(s) for which a third party is needed to perform slice authentication, the third party provides the address(es) of the authentication server(s) that perform(s) slice authentication, and the operator generates a corresponding pseudo code(s) for the slice identifier(s); on the other hand, the operator delivers the pseudo code(s) to the third party, and the third party completes correspondence between the pseudo code(s) and the corresponding authentication authorization information in the authentication server(s). It is to be understood that after a terminal user registers one certain slice service, the authentication server stores the authentication authorization information of the terminal user, the corresponding slice user identifier and the pseudo code corresponding to the corresponding slice service. Based thereon, after the authentication server receives the second message, the corresponding authentication authorization information is determined based on the first slice user identifier and the first pseudo code in the second message.

It is to be noted that one slice user identifier can correspond to at least one slice identifier, that is, a user may use the same account number to register a plurality of network slice services. Based thereon, the authentication server needs to use the first user identifier and the first pseudo code to determine the authentication authorization information of the UE, so as to determine the authentication authorization information corresponding to the terminal user and slice identifier.

In some optical embodiments of the disclosure, the method further includes: the authentication server performs authentication based on the authentication authorization information to obtain a slice authentication result; and a third message is sent to the network device. The third message is a message corresponding to the second message and containing the slice authentication result. The third message includes an identifier of the second message; or third message includes first pseudo code, the first card user identifier and an identifier of the second message.

In some optional embodiments of the disclosure, the method further includes: the authentication server sends a request for slice re-authentication or slice revocation to the network device. The request includes a second pseudo code and a second card user identifier.

By adoption of the technical solution of the embodiment of the disclosure, the first slice identifier is mapped into the first pseudo code through the network device, and the second message containing the first pseudo code is sent, so that the first pseudo code does not carry privacy information anymore. In addition, the network device receives the first pseudo sent by the authentication server, and can determine the first slice identifier corresponding to the pseudo code, so that the slice to be processed can be identified, and reveal of the privacy information is avoided.

The information processing method according to the embodiment of the disclosure is elaborated in detail below with reference to specific examples.

In the following embodiments, a UE, an AMF, an AAA-P, and an AAA-S may be included in a system architecture to which the information processing method is applied, where the AAA-P serves is taken as a network device in the above embodiment of the disclosure, and the AAA-S serves is taken as an authentication server in the above embodiment of the disclosure.

Embodiment One

Figure 3:
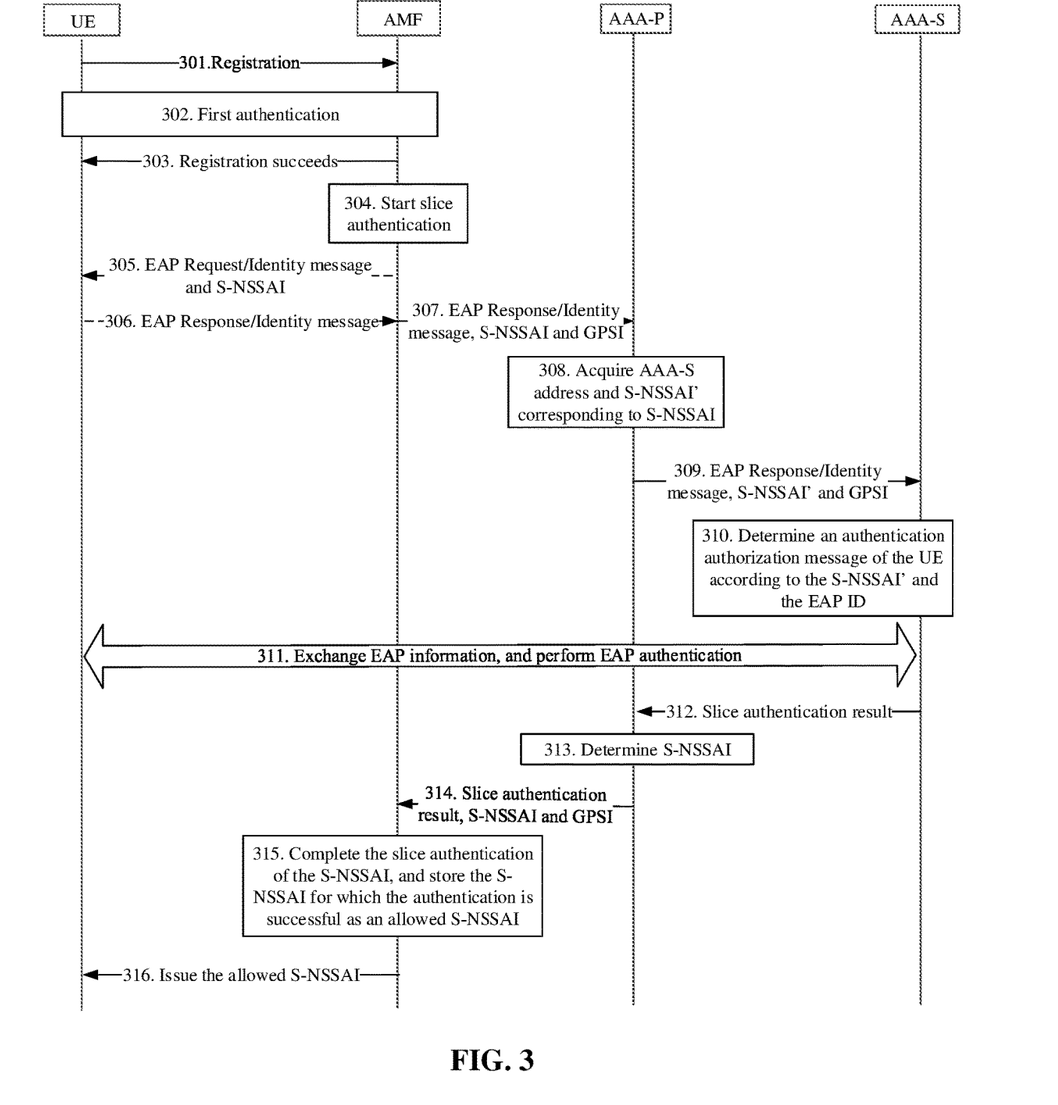
FIG. 3 is an interaction flowchart I of an information processing method according to an embodiment of the disclosure.

The example is an interactive illustration of the slice-specific authentication procedure. FIG. 3 is an interaction flowchart I of an information processing method according to an embodiment of the disclosure. As shown in FIG. 3, the method includes the following operations.

At S301, a UE is powered on for registration.

Here, the UE carries a card user identifier during registration. Exemplarily, the card user identifier may be SUPI, SUCI or 5G-GUTI.

At S302, first authentication is performed between the UE and a core network, and registration information of the UE is obtained, the registration information including S-NSSAI information of a slice allowed to be accessed and a card user identifier which can be sent publicly and corresponds to the UE, and the card user identifier is a GPSI.

Here, the authentication performed by S302 is the first authentication performed by the UE to access the mobile communication network.

At S303, the AMF sends a registration success message to the UE. The AMF issues the S-NSSAI information which does not need slice authentication in the network slices allowed to be accessed by the UE to the UE along with the registration success message. Exemplarily, the AMF can generate the slice identifier information of the slice service allowed to be accessed by the UE according to the S-NSSAI information which does not need slice authentication, the slice identifier information being recorded as the allowed NSSAI (Allowed NSSAI), and the allowed NSSAI is sent to the UE along with the registration success message.

At S304, the AMF determines information of an S-NSSAI that needs slice authentication, and starts slice authentication.

At S305, the AMF sends an EAP Request/Identity message and the S-NSSAI that needs authentication to the UE.

At S306, the UE sends an EAP Response/Identity message and a slice user identifier corresponding to the S-NSSAI to the AMF. Exemplarily, the slice user identifier can be represented by an EAP ID. It is to be understood that the UE sends the EAP Response/Identity message and the S-NSSAI to the AMF, where the EAP Response/Identity message may include the EAP ID.

Here, the AMF correspondingly acquires another publicly available card user identifier according to some card user identifiers in the message sent by the UE. The another publicly available card user identity may be represented by a GPSI.

At S307, the AMF sends EAP Response/Identity message, the S-NSSAI and the GPSI to an AAA-P; the EAP Response/Identity message may include an EAP ID and an identifier of the message. A message composed of the EAP Response/Identity message, the S-NSSAI and the GPSI can be used as the first message in the aforementioned embodiment.

At S308: the AAA-P receives the EAP Response/Identity message, the S-NSSAI and the GPSI, and determines the AAA-S address corresponding to S-NSSAI and the pseudo code corresponding to S-NSSAI, where the pseudo code can be represented by S-NSSAI'.

Exemplarily, the AAA-P may store the first mapping set described in the previous embodiment, and the AAA-S address corresponding to the S-NSSAI and the pseudo code corresponding to the S-NSSAI can be obtained by querying the first mapping set. Or, the UDM may store the first mapping set, and AAA-P may send the S-NSSAI to a UDM, query the first mapping set through the UDM, obtain the AAA-S address corresponding to the S-NSSAI and the pseudo code corresponding to the S-NSSAI, and then send the obtained AAA-S address corresponding to the S-NSSAI and the pseudo code corresponding to the S-NSSAI to the AAA-P.

At S309, the AAA-P generates a message including the S-NSSAI', the GPSI and the EAP Response/Identity message, and sends the message to the AAA-S. The message in the step is the second message in the previous embodiment. The EAP Response/Identity message may include the EAP ID and the identifier of the message.

In an implementation mode, the AAA-P can store the relation of the identifier of the second message, the GPSI and the S-NSSAI (namely, the second mapping in the previous embodiment).

At S310, the AAA-S determines the authentication authorization message of the UE according to the S-NSSAI' and the EAP ID.

At S311, the AAA-S and the UE exchange EAP information according to the requirements of the EAP method, and perform EAP authentication.

At S312, the AAA-S sends a message containing the slice authentication result to the AAA-P. The message includes an EAP message, which includes the slice authentication result and the identifier of the second message, and the slice authentication result can include a result of slice authentication success or slice authentication failure. In an implementation mode, the message only contains the EAP message. In another implementation mode, the message includes the EAP message, the S-NSSAI' and the GPSI, where the EAP message may include the identifier of the second message.

The message in the step is the third message in the previous embodiment.

At S313, the AAA-P can determine the corresponding S-NSSAI.

In one implementation mode, if the third message does not include the S-NSSAI' or the GPSI, the AAA-P searches the second mapping by using the identifier of the second message according to the stored relation of the identifier of the second message, the GPSI and the S-NSSAI (namely, the second mapping in the previous embodiment) to obtain the corresponding S-NSSAI and GPSI.

In another implementation mode, if the third message includes the S-NSSAI' and the GPSI, the AAA-P may obtain the S-NSSAI corresponding to the S-NSSAI' by querying the first mapping set.

At S314, the AAA-P sends a message containing the slice authentication result to the AMF. The slice authentication result can include a result of slice authentication success or slice authentication failure. The message may include the S-NSSAI and the GPSI.

At S315, the AMF completes the slice authentication of the S-NSSAI. If the slice authentication result is authentication success, the AMF stores the S-NSSAI for which the authentication is successful as the S-NSSAI of the slice service which is allowed to be accessed by the UE and represented by the GPSI.

It is to be understood that the AMF may add the S-NSSAI for which the authentication is successful to the allowed NSSAI(s) in S303.

At S31, the AMF issues the allowed S-NSSAI(s) to the UE.

Embodiment Two

Figure 4:
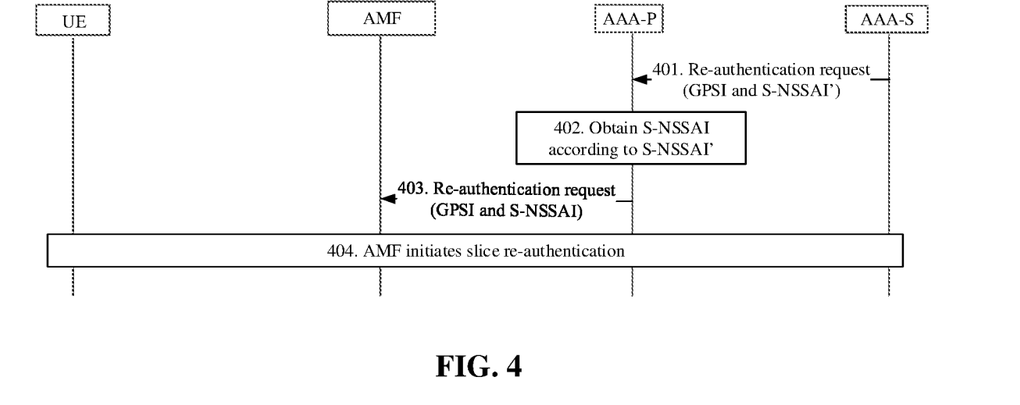
FIG. 4 is an interaction flowchart II of an information processing method according to an embodiment of the disclosure.

The example is an interactive illustration of the slice-specific authentication procedure. FIG. 4 is an interaction flowchart II of an information processing method according to an embodiment of the disclosure. As shown in FIG. 4, the method includes the following operations.

At S401, the AAA-S sends a re-authentication request to the AAA-P. The re-authentication request includes the S-NSSAI' and the GPSI.

At S402, the AAA-P obtains the corresponding S-NSSAI according to the S-NSSAI'.

Exemplarily, as an implementation mode, the AAA-P may determine the S-NSSAI corresponding to the S-NSSAI' according to the first mapping set stored therein. As another implementation mode, the first mapping set may be stored in the UDM, and the AAA-P may send the S-NSSAI' to the UDM, and the UDM may query the first mapping set to obtain the S-NSSAI corresponding to the S-NSSAI'.

At S403, the AAA-P sends a re-authentication request to the AMF. The re-authentication request includes the S-NSSAI' and the GPSI. The AMF can determine the UE and the network slice for which slice re-authentication is to be performed.

At S404, the AMF initiates slice re-authentication for the UE access slice S-NSSAI, and the slice-specific re-authentication procedure is similar to the slice-specific authentication procedure shown in FIG. 3, which will not be repeated here.

Embodiment Three

Figure 5:
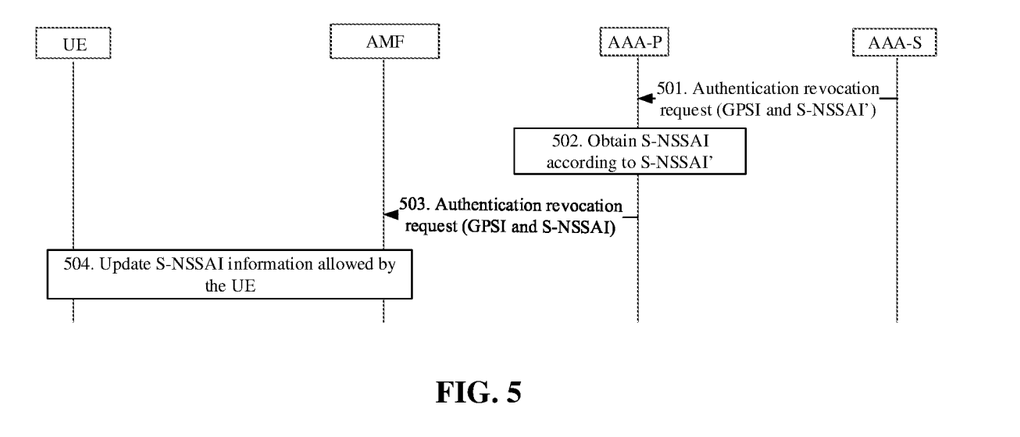
FIG. 5 is an interaction flowchart III of an information processing method according to an embodiment of the disclosure.

The example is an interactive illustration of a slice-specific revocation procedure. FIG. 5 is an interaction flowchart III of an information processing method according to an embodiment of the disclosure. As shown in FIG. 5, the method includes the following operations.

At S501, the AAA-S sends an authentication revocation request to the AAA-P, and the authentication revocation request includes the S-NSSAI' and the GPSI.

The authentication revocation request is used for revoking authorization of the S-NSSAI' network slice with the UE identifier of GPSI.

At S502, the AAA-P obtains the S-NSSAI', and obtains the corresponding S-NSSAI according to the S-NSSAI'.

Exemplarily, as an implementation mode, the AAA-P may determine the S-NSSAI corresponding to the S-NSSAI' according to the first mapping set stored therein. As another implementation mode, the first mapping set may be stored in the UDM, then the AAA-P may send the S-NSSAI' to the UDM, and the UDM may query the first mapping set to obtain the S-NSSAI corresponding to the S-NSSAI'.

At S503, the AAA-S sends an authentication revocation request to the AMF. The authentication revocation request includes the S-NSSAI' and the GPSI.

At S504, the AMF and the UE update (or delete) the S-NSSAI(s) allowed to be accessed.

Here, the allowed NSSAI(s) is/are pre-acquired and stored in the UE and the AMF (refer to S302 or S315 in the aforementioned embodiment). For the AMF, the corresponding information set of the S-NSSAI(s) allowed to accessed for each UE is stored in the allowed NSSAI(s). For a UE, the allowed NSSAI(s) is/are an information set of the S-NSSAI(s) allowed to be accessed by the UE. After the UE and AMF obtain the S-NSSAI and the GPSI, the AMF determines the information set of the S-NSSAI(s) corresponding to the GPSI by searching by using the GPSI, and deletes information related to the S-NSSAI(s) in the authentication revocation request from the information set of the S-NSSAI(s); for the UE, the information related to the S-NSSAI(s) in the authentication revocation request can be directly deleted from the information set of the S-NSSAI(s).

Figure 6:
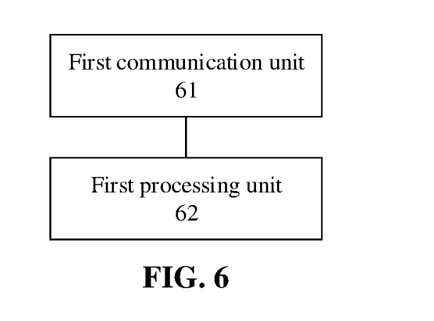
FIG. 6 is a composition structure diagram I of a network device according to an embodiment of the disclosure.

The embodiments of the disclosure further provide a network device. FIG. 6 is a composition structure diagram I of a network device according to an embodiment of the disclosure. In FIG. 6, the network device includes a first communication unit 61 and a first processing unit 62.

The first communication unit 61 is configured to receive a first message for slice authentication sent by an AMF, and the first message includes a first slice identifier, a first slice user identifier and a first card user identifier.

The first processing unit 62 is configured to determine a first pseudo code and a first address of an authentication server corresponding to the first slice identifier, and generate a second message including the first pseudo code, the first slice user identifier and the first card user identifier.

The first communication unit 61 is further configured to send the second message to the authentication server based on the first address.

In some optional embodiments of the disclosure, the first processing unit 62 is configured to determine a first pseudo code and a first address of the authentication server corresponding to the first slice identifier based on a pre-stored first mapping set; the first mapping set includes a plurality of mappings among slice identifiers, one or more addresses of one or more authentication servers and pseudo codes; or, send, by means of the first communication unit 61, the first slice identifier to a UDM storing the first mapping set, and acquire the first pseudo code and the first address of the authentication server, which are sent by the UDM and correspond to the first slice identifier.

In some optional embodiments of the disclosure, any mapping in the mapping set is generated and stored in the first mapping set when the corresponding network slice in the mapping is subscribed.

Figure 7:
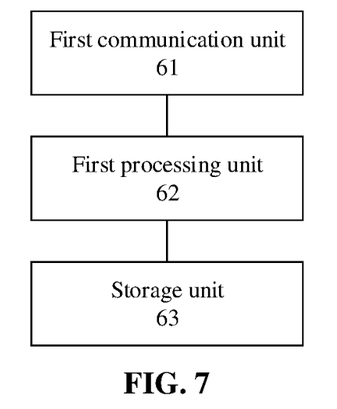
FIG. 7 is a composition structure diagram II of a network device according to an embodiment of the disclosure.

In some optional embodiments of the disclosure, as shown in FIG. 7, the network device further includes a storage unit 63, which is configured to store a second mapping among an identifier of the second message, the first card user identifier and the first slice identifier.

The first communication unit 61 is further configured to receive a third message sent by the authentication server; the third message is a message corresponding to the second message and containing a slice authentication result; and the third message includes the identifier of the second message.

The first processing unit 62 is further configured to determine the first card user identifier and the first slice identifier corresponding to the identifier of the second message based on the second mapping.

In some optional embodiments of the disclosure, the first communication unit 61 is further configured to receive a third message sent by the authentication server; the third message is a message corresponding to the second message and containing a slice authentication result; and the third message includes the first pseudo code, the first card user identifier and an identifier of the second message.

The first processing unit 62 is further configured to determine the first slice identifier corresponding to the first pseudo code according to the first mapping set.

The first communication unit 61 is further configured to receive a request for slice re-authentication or slice revocation sent by the authentication server; and the request includes: a second pseudo code and a second card user identifier.

The first processing unit 62 is further configured to determine a second slice identifier corresponding to the second pseudo code.

In some optional embodiments of the disclosure, the first processing unit 62 is configured to determine a second slice identifier corresponding to the second pseudo code based on a pre-stored first mapping set; the first mapping set includes a plurality of mappings among slice identifiers, one or more addresses of one or more authentication servers and pseudo codes; or, send, by means of the first communication unit 61, the second slice identifier to a UDM storing the first mapping set, and acquire a second slice identifier which is sent by the UDM and corresponds to the second pseudo code.

In the embodiment of the disclosure, the first processing unit 62 in the network device may be implemented by a Central Processing Unit (CPU), a Digital Signal Processor (DSP), a Microcontroller Unit (MCU) or a Field-Programmable Gate Array (FPGA) in the network device in practice. The storage unit 63 in the network device can be implemented by a memory in practice; the first communication unit 61 in the network device can be implemented by a communication module (including basic communication suite, operating system, communication module, standardized interface and protocol, etc.) and a transceiver antenna in practice.

It is to be noted that the network device provided by the above embodiments is only exemplified by the division of the above program modules when processing information. In practice, the above-mentioned processing assignment may be completed by different program modules as required, i.e., the internal structure of the network device is divided into different program modules to complete all or part of the above-described processing. In addition, the network device provided by the embodiments and the image processing method embodiment belong to the same concept, and the detailed implementation process thereof is detailed in the method embodiment and will be omitted herein.

Figure 8:
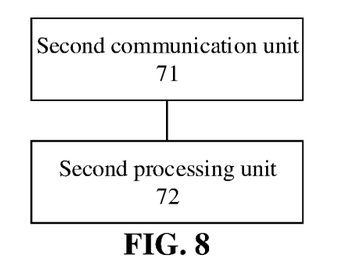
FIG. 8 is a composition structure diagram of an authentication server according to an embodiment of the disclosure.

The embodiments of the disclosure further provide an authentication server. FIG. 8 is a composition structure diagram of an authentication server according to an embodiment of the disclosure. As shown in FIG. 8, the authentication server includes a second communication unit 71 and a second processing unit 72.

The second communication unit 71 is configured to receive a second message from a network device; the second message includes: a first slice user identifier, the first card user identifier and a first pseudo code; and the first pseudo code corresponds to a first slice identifier for slice authentication.

The second processing unit 72 is configured to determine authentication authorization information based on the first slice user identifier and the first pseudo code.

In some optional embodiments of the disclosure, the second processing unit 72 is further configured to perform authentication based on the authentication authorization information to obtain a slice authentication result.

The second communication unit 71 is further configured to send a third message to the network device; the third message is a message corresponding to the second message and containing the slice authentication result; the third message includes an identifier of the second message; or third message includes the first pseudo code, the first card user identifier and the identifier of the second message.

In some optional embodiments of the disclosure, the second communication unit 71 is further configured to send a request for slice re-authentication or slice revocation to the network device; and the request includes: a second pseudo code and a second card user identifier.

In the embodiment of the disclosure, the second processing unit 72 in the authentication server may be implemented by a CPU, a DSP, an MCU or an FPGA in the authentication server in practice. The second communication unit 71 in the authentication server can be implemented by a communication module (including basic communication suite, operating system, communication module, standardized interface and protocol, etc.) and a transceiver antenna in practice.

It is to be noted that the authentication server provided by the above embodiments is only exemplified by the division of the above program modules when processing information. In practice, the above-mentioned processing assignment may be completed by different program modules as required, i.e., the internal structure of the authentication server is divided into different program modules to complete all or part of the above-described processing. In addition, the authentication server provided by the embodiments and the image processing method embodiment belong to the same concept, and the detailed implementation process thereof is detailed in the method embodiment and will be omitted herein.

Figure 9:
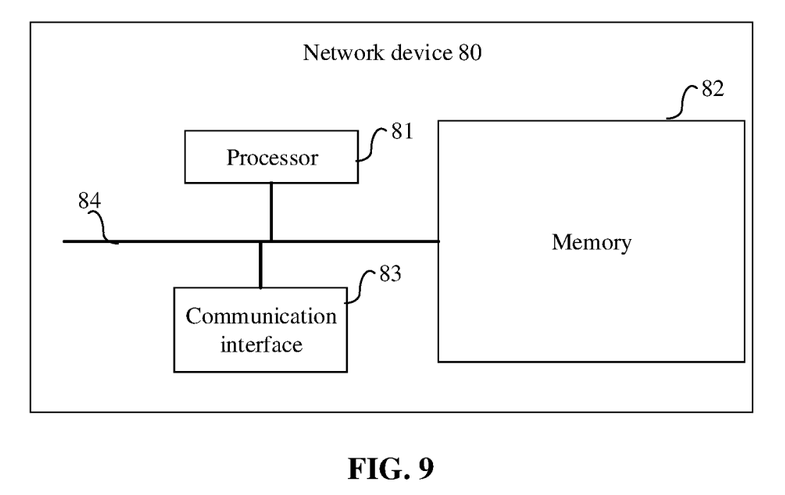
FIG. 9 is a composition structure diagram of a network device according to an embodiment of the disclosure.

The embodiments of the disclosure further provide a network device, which may be the above-mentioned AMF or authentication server. FIG. 9 is a composition structure diagram of a network device according to an embodiment of the disclosure. As shown in FIG. 9, the network device 80 may include a memory 82, a processor 81 and a computer program which is stored on the memory 82 and may run on the processor 81. When executing the program, the processor 81 implements the steps of the information processing method applied to the network device or the authentication server according to the embodiments of the disclosure.

In the embodiment, the network device 80 may also include a communication interface 83. Optionally, various components in the network device 80 are coupled together through a bus system 84. It is to be understood that the bus system 84 is configured to implement the connection communication between these components. The bus system 43 further includes a power bus, a control bus and a status signal bus in addition to a data bus. However, for clarity, the various buses are designated as the bus system 84 in FIG. 9.

It is to be understood that the memory 82 may be a volatile memory or a non-volatile memory, or may include both the volatile and non-volatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc or a Compact Disc Read-Only Memory (CD-ROM); and the magnetic surface memory may be a magnetic disk memory or magnetic tape memory. The volatile memory may be a Random Access Memory (RAM), and serves as an external high-speed cache. Through illustrative but not restrictive description, many forms of RAMs may be available, for example, a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 82 described in the embodiment of the disclosure includes but not limited to these and any other appropriate types of memories.

The methods disclosed in the embodiments of the present disclosure described above may be applied to the processor 81 or implemented by the processor 81. The processor 81 may be an integrated circuit chip, and has a signal processing capability. In an implementation process, each step of the methods may be completed by an integrated logical circuit of hardware in the processor 81 or an instruction in a software form. The processor 81 described above may be a general-purpose processor, a DSP, or other programmable logic devices, discrete gates or transistor logic devices, discrete hardware components, etc. The processor 81 may implement or execute each method, step or logic block diagram disclosed in the embodiments of the disclosure. The universal processor may be a microprocessor, or any conventional processor, etc. The step of the method disclosed in combination with the embodiments of the disclosure may be directly embodied as a hardware decoding processor for execution and completion, or a combination of hardware and software modules in the decoding processor for execution and completion. The software module may be located in a storage medium, which is located in the memory 82, and the processor 81 reads information in the memory 82, and completes the steps of the foregoing methods in combination with hardware.

In an exemplary embodiment, the network device 80 may be implemented by one or more Application Specific Integrated Circuits (ASICs), DSPs, Programmable Logic Devices (PLDs), Complex Programmable Logic Devices (CPLDs), FPGAs, general purpose processors, controllers, MCUs, Microprocessors, or other electronic components, and is configured to execute the foregoing method.

In the exemplary embodiment, the embodiments of the present disclosure also provide a computer readable storage medium, such as a memory 82 including a computer program, which can be executed by the processor 81 of the network device 80 to complete the steps of the foregoing method. The computer readable storage medium may be the memory such as the FRAM, the ROM, the PROM, the EPROM, the EEPROM, the Flash Memory, the magnetic surface memory, the optical disk, or CD-ROM, and may also be various devices including one or any combination of the above memories.

A computer program is stored on the computer readable storage medium provided by the embodiments of the disclosure. When executed by a processor, the program implements the steps of the image processing method applied to the network device or the authentication server the according to the embodiments of the disclosure.

The methods disclosed in some method embodiments provided in the application may be freely combined without conflicts to obtain new method embodiments.

The characteristic disclosed in several product embodiments provided in the present application may be arbitrarily combined without conflict to obtain a new product embodiment.

The characteristics disclosed in some method or device embodiments provided in the application may be freely combined without conflicts to obtain new method embodiments or device embodiments.

In the several embodiments provided in the application, it should be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments of the application.

In addition, each functional unit in each embodiment of the application may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art can understand that all or part of the steps of the above method embodiments may be completed by a program instructing related hardware. The foregoing program may be stored in a computer readable storage medium. When the program is executed, the steps of the above method embodiments are performed. The foregoing storage medium includes: various media capable of storing program codes such as a mobile storage device, a ROM, a RAM, a magnetic disk, or an optical disk.

Or, when implemented in form of software functional module and sold or used as an independent product, the integrated unit of the application may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The storage medium includes: various media capable of storing program codes such as a mobile hard disk, a ROM, a magnetic disk, or an optical disc.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the disclosure shall be subject to the scope of protection of the claims.

The invention claimed is:

1. An information processing method, comprising:
    receiving, by a network device, a first message for slice authentication sent by an Access and Mobility Management Function (AMF), wherein the first message comprises a first slice identifier, a first slice user identifier and a first card user identifier;
    determining a first pseudo code and a first address of an authentication server corresponding to the first slice identifier, and generating a second message comprising the first pseudo code, the first slice user identifier and the first card user identifier, wherein the first pseudo code does not carry privacy information, the first pseudo code corresponds to the first slice identifier for slice authentication, and the first pseudo code and the first slice user identifier in the second message are configured to determine authentication authorization information; and
    sending the second message to the authentication server based on the first address;
    wherein before sending the second message to the authentication server, after a terminal user registers one certain slice service, the authentication authorization information, the corresponding first slice user identifier and the corresponding first pseudo code are stored in the authentication server.

2. The method of claim 1, wherein determining the first pseudo code and the first address of the authentication server corresponding to the first slice identifier comprises:
    determining the first pseudo code and the first address of the authentication server corresponding to the first slice identifier based on a pre-stored first mapping set, wherein the pre-stored first mapping set comprises a plurality of mappings among slice identifiers, one or more addresses of one or more authentication servers and pseudo codes; or,
    sending the first slice identifier to a Unified Data Manager (UDM) storing the pre-stored first mapping set; and
    acquiring the first pseudo code and the first address of the authentication server sent by the UDM and corresponding to the first slice identifier.

3. The method of claim 1, wherein the method further comprises:
    storing, by the network device, a second mapping among an identifier of the second message, the first card user identifier and the first slice identifier;
    receiving, by the network device, a third message sent by the authentication server, wherein the third message is a message corresponding to the second message and containing a slice authentication result, and comprises the identifier of the second message; and
    determining the first card user identifier and the first slice identifier corresponding to the identifier of the second message based on the second mapping.

4. The method of claim 2, wherein the method further comprises:
    receiving, by the network device, a third message sent by the authentication server, wherein the third message is a message corresponding to the second message and containing a slice authentication result, and comprises the first pseudo code, the first card user identifier and an identifier of the second message; and
    determining the first slice identifier corresponding to the first pseudo code according to the pre-stored first mapping set.

5. The method of claim 1, wherein the method further comprises:
    receiving, by the network device, a request for slice re-authentication or slice revocation sent by the authentication server, wherein the request comprises: a second pseudo code and a second card user identifier; and
    determining a second slice identifier corresponding to the second pseudo code.

6. The method of claim 5, wherein determining the second slice identifier corresponding to the second pseudo code comprises:
    determining the second slice identifier corresponding to the second pseudo code based on a pre-stored first mapping set, wherein the pre-stored first mapping set comprises a plurality of mappings among slice identifiers, one or more addresses of one or more authentication servers and pseudo codes; or,
    sending the second slice identifier to a Unified Data Manager (UDM) storing the pre-stored first mapping set, and acquiring the second slice identifier sent by the UDM and corresponding to the second pseudo code.

7. An information processing method, comprising:
    receiving, by an authentication server, a second message from a network device, wherein the second message comprises a first slice user identifier, a first card user identifier and a first pseudo code, the first pseudo code corresponds to a first slice identifier for slice authentication, and the first pseudo code does not carry privacy information;
    determining authentication authorization information using the first slice user identifier and the first pseudo code in the second message; and
    performing, by the authentication server, the slice authentication based on the authentication authorization information to obtain a slice authentication result;
    wherein before receiving the second message, after a terminal user registers one certain slice service, the authentication server stores the authentication authorization information, the corresponding first slice user identifier and the corresponding first pseudo code.

8. The method of claim 7, wherein the method further comprises:
sending a third message to the network device,
wherein the third message is a message corresponding to the second message and containing the slice authentication result, and
wherein the third message comprises an identifier of the second message, or the third message comprises the first pseudo code, the first card user identifier and the identifier of the second message.

9. The method of claim 7, wherein the method further comprises:
sending, by the authentication server, a request for slice re-authentication or slice revocation to the network device, wherein the request comprises a second pseudo code and a second card user identifier.

10. A network device, comprising a communication interface and a processor, wherein
the communication interface is configured to receive a first message for slice authentication sent by an Access and Mobility Management Function (AMF), wherein the first message comprises a first slice identifier, a first slice user identifier and a first card user identifier;
the processor is configured to determine a first pseudo code and a first address of an authentication server corresponding to the first slice identifier, and generate a second message comprising the first pseudo code, the first slice user identifier and the first card user identifier, wherein the first pseudo code does not carry privacy information, the first pseudo code corresponds to the first slice identifier for slice authentication, and the first pseudo code and the first slice user identifier in the second message are configured to determine authentication authorization information; and
the communication interface is further configured to send the second message to the authentication server based on the first address;
wherein before sending the second message to the authentication server, after a terminal user registers one certain slice service, the authentication authorization information, the corresponding first slice user identifier and the corresponding first pseudo code are stored in the authentication server.

11. The network device of claim 10, wherein the processor is configured to:
determine the first pseudo code and the first address of the authentication server corresponding to the first slice identifier based on a pre-stored first mapping set, wherein the pre-stored first mapping set comprises a plurality of mappings among slice identifiers, one or more addresses of one or more authentication servers and pseudo codes; or,
send, by means of the communication interface, the first slice identifier to a Unified Data Manager (UDM) storing the pre-stored first mapping set, and acquire the first pseudo code and the first address of the authentication server sent by the UDM and corresponding to the first slice identifier.

12. The network device of claim 10, wherein the network device further comprises a storage unit, configured to store a second mapping among an identifier of the second message, the first card user identifier and the first slice identifier;
the communication interface is further configured to receive a third message sent by the authentication server, wherein the third message is a message corresponding to the second message and containing a slice authentication result, and comprises the identifier of the second message; and
the processor is further configured to determine the first card user identifier and the first slice identifier corresponding to the identifier of the second message based on the second mapping.

13. The network device of claim 11, wherein the communication interface is further configured to receive a third message sent by the authentication server, wherein the third message is a message corresponding to the second message and containing a slice authentication result; and comprises the first pseudo code, the first card user identifier and an identifier of the second message; and
the processor is further configured to determine the first slice identifier corresponding to the first pseudo code according to the pre-stored first mapping set.

14. The network device of claim 10, wherein the communication interface is further configured to receive a request for slice re-authentication or slice revocation sent by the authentication server, wherein the request comprises a second pseudo code and a second card user identifier; and
the processor is further configured to determine a second slice identifier corresponding to the second pseudo code.

15. The network device of claim 14, wherein the processor is configured to:
determine a second slice identifier corresponding to the second pseudo code based on a pre-stored first mapping set, wherein the pre-stored first mapping set comprises a plurality of mappings among slice identifiers, one or more addresses of one or more authentication servers and pseudo codes; or,
send, by means of the communication interface, the second slice identifier to a Unified Data Manager (UDM) storing the pre-stored first mapping set, and acquire the second slice identifier sent by the UDM and corresponding to the second pseudo code.

16. An authentication server, comprising a memory, a processor, a communication interface and a computer program which is stored in the memory and runnable on the processor, wherein the processor, when executing the computer program, is configured to cooperate with the communication interface to implement the method of claim 7.

17. The authentication server of claim 16,
wherein the processor is further configured to send, by means of the communication interface, a third message to the network device,
wherein the third message is a message corresponding to the second message and containing the slice authentication result, and
wherein the third message comprises an identifier of the second message, or the third message comprises the first pseudo code, the first card user identifier and the identifier of the second message.

18. The authentication server of claim 16, wherein the processor is further configured to send, by means of the communication interface, a request for slice re-authentication or slice revocation to the network device, wherein the request comprises a second pseudo code and a second card user identifier.

19. A non-transitory computer readable storage medium, having stored thereon a computer program which, when executed by a processor, implements the method of claim 1.

20. A non-transitory computer readable storage medium, having stored thereon a computer program which, when executed by a processor, implements the method of claim 7.

\* \* \* \* \*